(12) United States Patent
Kondou et al.

(10) Patent No.: US 6,339,491 B1
(45) Date of Patent: Jan. 15, 2002

(54) DUSTPROOF STRUCTURE OF OPTICAL BOX

(75) Inventors: Kiyoshi Kondou; Seiichi Inoue, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/457,674

(22) Filed: Dec. 9, 1999

(30) Foreign Application Priority Data

Dec. 9, 1998 (JP) .......................................... 10-349886

(51) Int. Cl.[7] .............................................. G02B 26/08
(52) U.S. Cl. ........................ 359/212; 359/216; 347/261
(58) Field of Search ................................ 359/507, 508, 359/514, 216, 217, 218, 219, 212; 347/259, 260, 261, 263, 225, 242, 243

(56) References Cited

U.S. PATENT DOCUMENTS

| | | | |
|---|---|---|---|
| 3,788,750 A | * | 1/1974 | Maltby, Jr. et al. ......... 356/239 |
| 4,819,012 A | * | 4/1989 | Kiyohara et al. ......... 346/140 R |
| 5,343,029 A | * | 8/1994 | Katoh et al. ................. 235/467 |
| 5,613,174 A | * | 3/1997 | Denton et al. ................. 399/98 |
| 5,663,558 A | * | 9/1997 | Sakai .......................... 359/212 |
| 5,946,078 A | * | 8/1999 | Morimoto et al. ............. 355/30 |
| 6,029,028 A | * | 2/2000 | Inoue .......................... 399/92 |

* cited by examiner

Primary Examiner—Cassandra Spyrou
Assistant Examiner—Euncha Cherry
(74) Attorney, Agent, or Firm—Sughrue Mion, PLLC

(57) ABSTRACT

There is provided a dustproof structure of an optical box in which intrusion of dust into the optical box can be prevented. Laser beams deflected by a polygon mirror of an optical box are transmitted through an optical system and exit from an opening outside the optical box, and reach a photographic printing paper. In this case, when dust and the like adhere to the polygon mirror or the optical box, the function of such an optical element deteriorates. Therefore, a dustproofing effect is required by the optical box. Accordingly, by supplying air into the optical box using a fan to thereby pressurize an interior of the optical box, the intrusion of dust from outside of the optical box into the optical box can be prevented, thereby making it possible to prevent dust or the like from adhering to the polygon mirror or the optical system.

12 Claims, 10 Drawing Sheets

DUSTPROOF STRUCTURE OF OPTICAL BOX

BACKGROUND OF THE INVENTION

1. Field of the Invention

The present invention relates to a dustproof structure of an optical box in which a latent image is formed by effecting scan and exposure on a photosensitive material using a laser beam.

2. Description of the Related Art

In recent years, an image exposure apparatus, in which a photographic printing paper is scanned and exposed using a light source which emits a laser beam, has been widely used in writing in a digital laboratory system for recording, on a photographic printing paper, an image recorded on a photographic film.

Such an image exposure apparatus includes light sources which respectively emit laser beams of red (R), green (G), and blue (B), and based on color image data, modulates the laser beam for each of the colors of R, G, and B. The laser beam is deflected by a deflecting device such as a polygon mirror in a main scan direction, and the photographic printing paper is conveyed in a sub-scan direction. The photographic printing paper is thus scanned and exposed with the laser beam via an optical system comprised of an fθ lens, a cylindrical lens, a plane mirror, a reflexing mirror, and the like, and a color image is recorded on the photographic printing paper.

In a scanning optical system used in the above-described image exposure apparatus, as shown in FIG. 10, a deflecting device such as a polygon mirror 250, and an optical system 252 are disposed within an optical box 254 so as to prevent dust and the like from adhering thereto. An exit window 256 is formed on a side surface 254A of the optical box 254 and a laser beam is transmitted through the exit window 256. Further, a duct 258 is provided in the vicinity of the exit window 256 and includes a fan 260. During scan and exposure, air flow is supplied into the duct 258 by the fan 260 so as to prevent dust from adhering to the exit window 256 and the like.

However, the above-described dustproof structure can prevent dust from adhering to the exit window, but cannot prevent dust from adhering to the deflecting device such as a polygon mirror, and the optical system, which are disposed within the optical box. In order to prevent deterioration in the image quality of a photographic printing paper or the like, it is necessary to prevent dust from directly adhering to the deflecting device, the optical system, and the like.

SUMMARY OF THE INVENTION

Accordingly, an object of the present invention is to provide a dustproof structure of an optical box, which can prevent intrusion of dust into the optical box.

In accordance with a first aspect of the present invention, there is provided a dustproof structure of an optical box, which is used in an optical box which includes a polygon section comprised of deflecting means for deflecting laser beams and an optical system by which laser beams deflected by the deflecting means are converged on a photosensitive material, the dustproof structure of an optical box comprising: an opening formed in the optical box for guiding the laser beams to the photosensitive material; and pressurizing means for pressurizing an interior of the optical box by supplying air to the interior of the optical box, thereby preventing intrusion of dust from the opening and from outside of the optical box.

According to the above-described structure, during the scan and exposure, the laser beams are deflected by the deflecting means. The laser beams deflected by the deflecting means are transmitted through the optical system and emitted from the opening. Thereafter, the laser beams are converged on the photosensitive material.

In this case, air is supplied into the optical box by the pressurizing means so that the interior of the optical box is pressurized. For this reason, intrusion of dust from the opening and from the outside of the optical box can be prevented. As a result, no dust adheres to the deflecting means and the optical system and the respective functions thereof can be maintained.

In accordance with a second aspect of the present invention, there is provided a dustproof structure of an optical box according to the first aspect which further comprises: opening and closing means for opening and closing the opening; and control means in which, when scan and exposure is being carried out by the laser beams, the opening is opened by the opening and closing means, and thereafter, the interior of the optical box is pressurized by the pressurizing means, and when the scan and exposure ends, the pressurizing means is stopped, and thereafter, the opening is closed by the opening and closing means.

According to the above-described structure, it is necessary to prevent the intrusion of dust from the opening into the optical box, and therefore, the opening and closing means is provided in the opening. The opening is closed by the opening and closing means in a normal state (in a state of no scan and exposure being effected).

In order for the laser beams to be guided to the photosensitive material when the photosensitive material is scanned and exposed by the laser beams, the opening is placed in an open state by the opening and closing means. Thereafter, the pressurizing means is controlled by the control means so that the interior of the optical box is pressurized.

When the scan and exposure of the photosensitive material by the laser beams is completed, the pressurizing means is controlled by the control means to stop pressurization, and thereafter, the opening is placed in a closed state by the opening and closing means.

As described above, during the scan and exposure, the opening is opened by the opening and closing means, and thereafter, the interior of the optical box is pressurized. When the scan and exposure is completed, the opening is controlled so as to be closed after the pressurization has been stopped. As a result, the interior of the optical box is pressurized with the opening being placed in a constantly open state, and therefore, it is possible to prevent dust and the like adhering to the inner side of the opening and closing means from spreading within the optical box.

Further, in accordance with a third aspect of the present invention, there is provided a dustproof structure of an optical box according to the first aspect, in which a light source section which emits the laser beams, the polygon section, and an exit section which emits the laser beams emitted from the polygon section outside the optical box are provided in such a manner that differences in the degree of sealing are made among chambers in which the three sections are disposed by partitioning.

According to the above-described structure, the light source section, the polygon section, and the exit section are disposed by partitioning in the respective corresponding chambers. As a result, differences in the degree of sealing between these chambers are made.

In this case, generally, a high-level sealing degree is required by the polygon section, a medium-level sealing degree is required by the exit section, and a low-level of sealing degree is required by the light source section. Accordingly, by making differences in the degree of sealing between these chambers, the above-described requirements can be satisfied.

DESCRIPTION OF THE PREFERRED EMBODIMENTS

Referring now to the attached drawings, a dustproof structure of an optical box according to an embodiment of the present invention will be described.

Figure 1:
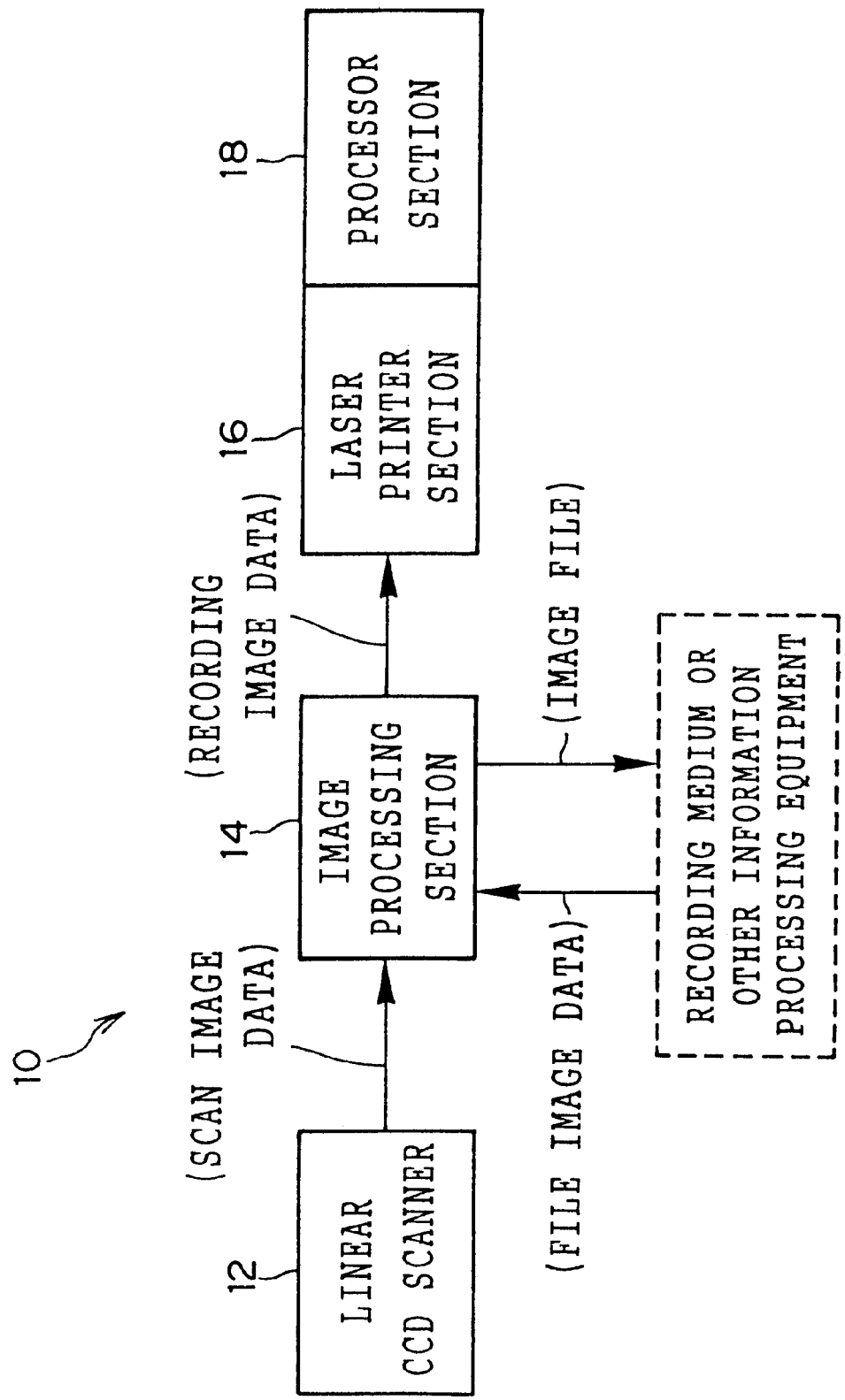
FIG. 1 is a schematic block diagram of a digital laboratory system to which a dustproof structure of an optical box according to an embodiment of the present invention is applied.
Figure 2:
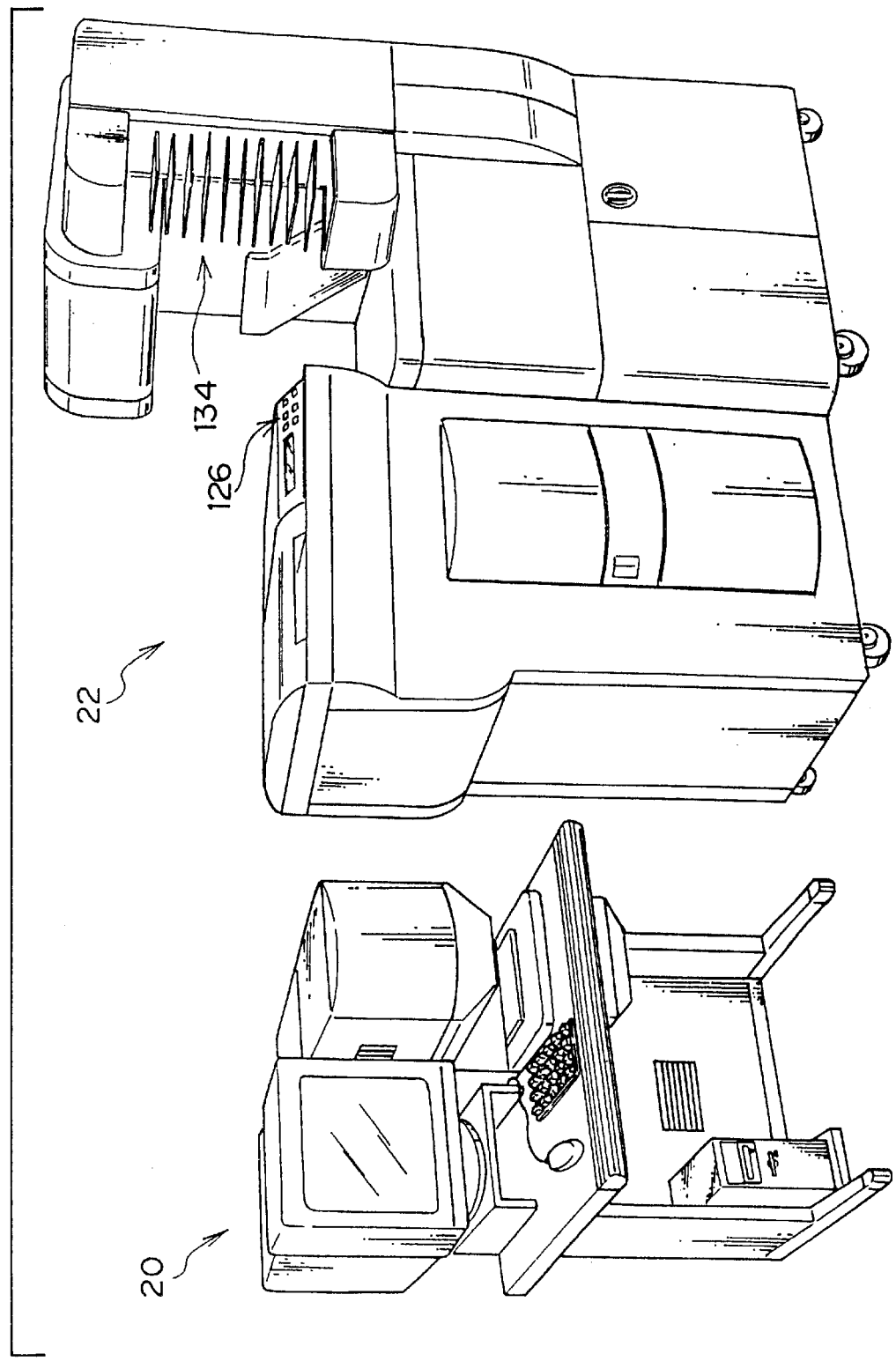
FIG. 2 is a diagram of the exterior of the digital laboratory system.

Generally, an optical box 11 (see FIG. 3) is applied to a digital laboratory system 10. FIG. 1 schematically shows the structure of the digital laboratory system 10. Further, FIG. 2 shows the outside of the digital laboratory system 10. First, a description will be given of the schematic structure of an entire system.

As shown in FIG. 1, the digital laboratory system 10 is structured to include a linear CCD scanner 12, an image processing section 14, a laser printer section 16, and a processor section 18. The linear CCD scanner 12 and the image processing section 14 are provided in an input section 20 shown in FIG. 2, and the laser printer section 16 and the processor section 18 are provided in an output section 22 shown in FIG. 2.

The linear CCD scanner 12 is used to read film images recorded on a photographic film such as a negative film or a reversal film. Examples of the photographic film on which film images to be read are recorded include a 135-size photographic film, a 110-size photographic film, a photographic film with a transparent magnetic layer formed thereon (i.e., a 240-size photographic film: a so-called APS film), and 120-size and 220-size photographic films (Brownie size). The linear CCD scanner 12 reads the above-described film images to be read by a linear CCD and outputs image data. The linear CCD scanner 12 may be replaced by an area CCD scanner for reading a film image by an area CCD.

The image processing section 14 inputs image data outputted from the linear CCD scanner 12 (that is, scan image data) and is constructed so as to be able to input image data obtained by photographing with a digital camera, image data obtained by reading an original (for example, a reflection original) other than a film image using a scanner, image data generated by a computer, and the like (which are generically hereinafter referred to as file image data) from the outside (for example, input of the image data via a recording medium such as a memory card, or input of the image data from other information processing equipment via a communication line).

The image processing section 14 effects image processing including various corrections and the like on the inputted image data, and further, outputs the image data, as recording image data, to the laser printer section 16. The image processing section 14 can also output, as an image file, the image data having been subjected to the image processing to the outside (for example, can output the same to a recording medium such as a memory card or can transfer the same to other information processing equipment via a communication line).

The laser printer section 16 includes laser light sources which emit laser beams of red (R), green (G), and blue (B), respectively. Laser beams modulated in accordance with recording image data inputted from the image processing section 14 is irradiated onto a photographic printing paper and an image is recorded on the photographic printing paper by scan and exposure.

In the processor section 18, the photographic printing paper on which an image has been recorded by scan and exposure in the laser printer section 16 is sequentially subjected to color development processing, bleach-fixing processing, washing processing, and drying processing. As a result, an image is formed on the photographic printing paper.

Next, the laser printer section to which the dustproof structure of an optical box according to the present invention will be described.

Figure 3:
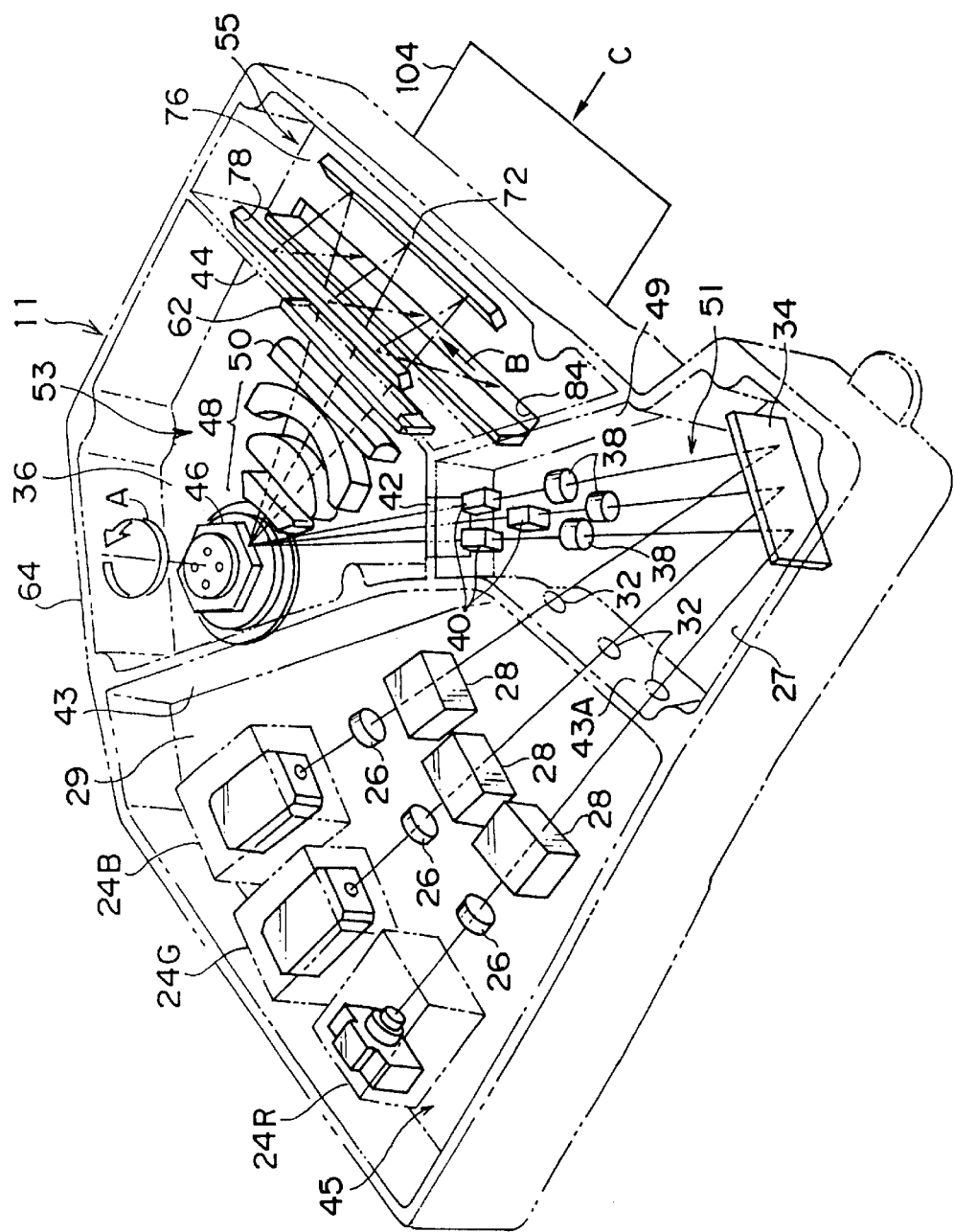
FIG. 3 is a schematic structural diagram of the dustproof structure optical box according to the embodiment of the present invention.

FIG. 3 shows the structure of an optical box 11 in the laser printer section 16. The optical box 11 includes three laser light sources 24R, 24G, and 24B serving as the light source. The laser light source 24R is comprised of a semiconductor laser (LD) which emits a laser beam having a wavelength of R (for example, 680 nm) and which is referred to below as laser beam R. The laser light source 24G is comprised of an LD and a wavelength conversion element (SHG) for converting a laser beam emitted from the LD to that having half the wavelength thereof, and an oscillating wavelength of the LD is set such that a laser beam having a wavelength of G (for example, 532 nm), which laser beam will be hereinafter referred to as laser beam G, is emitted from the SHG. Similarly, the laser light source 24B is also comprised of an LD and an SHG and an oscillating wavelength of the LD is set such that a laser beam having a wavelength of B (for example, 475 nm), which laser beam will be hereinafter referred to as laser beam B, is emitted from the SHG. The above-described LD may be replaced by a solid state laser.

A collimator lens 26 and an acoustooptic modulation element (AOM) 28 are sequentially arranged at each of laser emission sides of the laser light sources 24R, 24G and 24B. Each AOM 28 is connected to an AOM driver 30 (see FIG. 8) and is disposed in such a manner that an incident laser beam is transmitted through an acoustooptic medium. When a high-frequency signal is inputted from the AOM driver 30, an ultrasonic wave corresponding to the above-mentioned high-frequency signal is propagated through the acoustooptic medium and an acoustooptic effect acts on the laser beam transmitted through the acoustooptic medium to thereby cause diffraction. Therefore, a laser beam having an intensity corresponding to an amplitude of the high-frequency signal is emitted, as diffracted light, from the AOM 28.

The above-described laser light sources 24G, 24R, and 24B, collimator lenses 26, and AOMs 28 form a light source section 29. The light source section 29 is located in a first chamber 45 partitioned by a first intermediate wall 43 which is formed integrally with a side wall 64 of the optical box 11.

Three circular openings are formed in the first intermediate wall 43 on the side in which diffracted light is emitted from each of the AOMs 28, and are disposed at positions corresponding to respective diffracted light of laser beam R, laser beam G, and laser beam B emitted from the AOMs 28. A window glass 32 is fitted into each of the openings.

Further, a mirror 34 is disposed at the side of the first intermediate wall 43 opposite to the side at which the AOMs 28 are disposed. Accordingly, these laser beams transmitted through the window glasses 32 are reflected by the mirror 34. Spherical lenses 38 and cylindrical lenses 40 are disposed at the side of the mirror 34 from which the laser beams are emitted.

The above-described mirror 34, spherical lenses 38, and cylindrical lenses 40 form a reflecting section 27 of the optical box 11. In the optical box 11, a second intermediate wall 44 is formed so as to connect the side wall 64 of the optical box 11 and the first intermediate wall 43, and a third intermediate wall 49 is formed so as to connect the second intermediate wall 44 and the side wall 64 of the optical box 11. Accordingly, the reflecting section 27 is located in a second chamber 51 partitioned by the first intermediate wall 43, the second intermediate wall 44, and the third intermediate wall 49. A rectangular opening is formed in the second intermediate wall 44 and a window glass 42 is fitted into the opening.

Further, the optical box 11 includes a third chamber 53 partitioned by the first intermediate wall 43 and the second intermediate wall 44. A PLG section (polygon section) 36 is located in the third chamber 53, and a polygon mirror 46 serving as deflecting means is disposed in the PLG section 36. Accordingly, the laser beam R, laser beam G, and laser beam B each pass through the window glass 32 and are reflected by the mirror 34, and thereafter, these laser beams are transmitted through the spherical lenses 38, the cylindrical lenses 40, and the window glass 42, and are irradiated substantially at the same position on a reflecting surface of the polygon mirror 46 and further reflected by the polygon mirror 46.

Further, on an optical path where the laser beams reflected by the polygon mirror 46 are emitted and within the PLG section 36, an fθ lens 48 and a cylindrical lens 50 having a power in a sub-scan direction for optical compensation for the polygon pyramid error of the polygon mirror 46 are disposed. A repeating substrate 52 (which is not shown in FIG. 3, but shown in FIG. 4) is mounted at an opening of a bottom plate of the PLG section 36, and a connector 58 of a harness (not shown) from a motor 47 for driving the polygon mirror 46 and of a harness (not shown) from an electric power source is connected to the repeating substrate 52 and electric power is supplied from the outside to the motor 47 with the PLG section 36 being in an airtight state.

Figure 4:
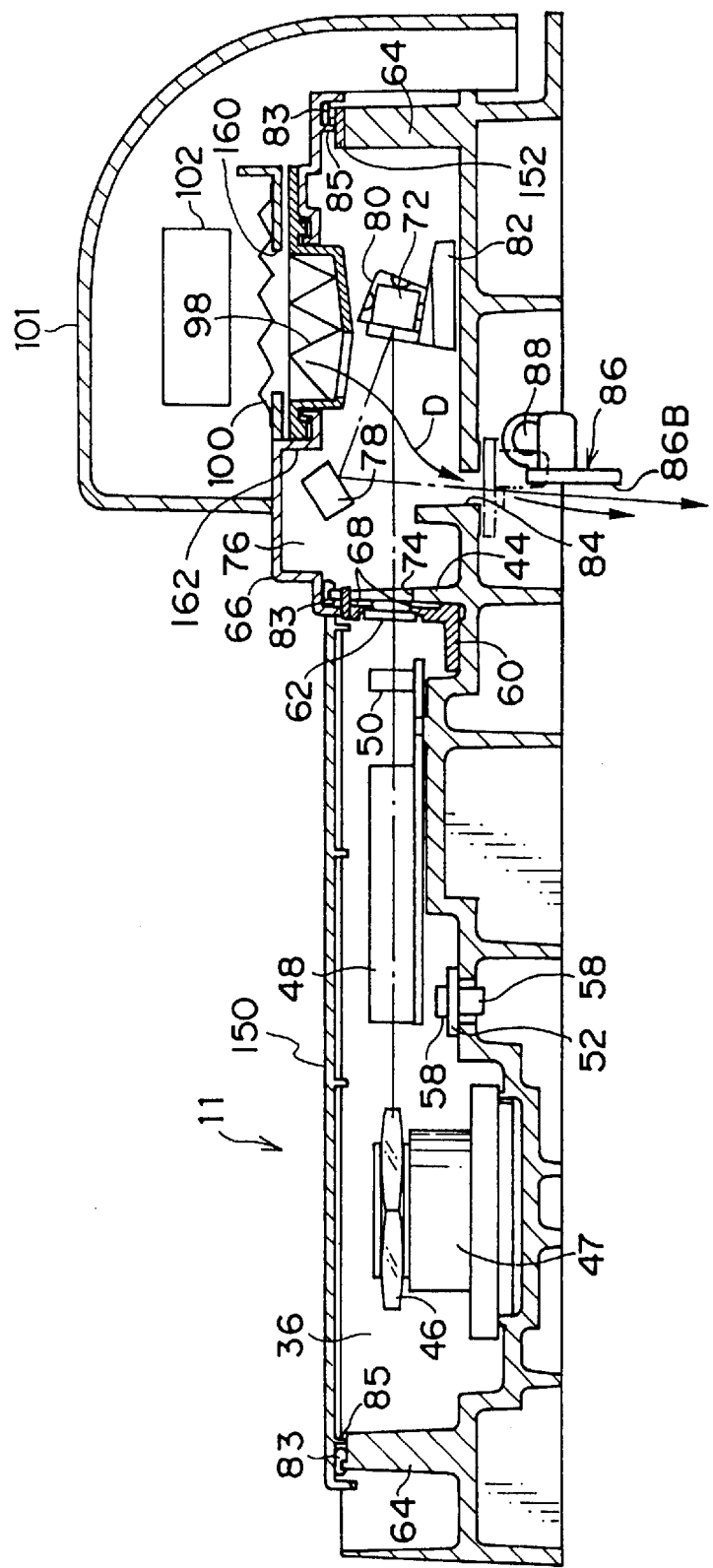
FIG. 4 is a cross-sectional view showing a PLG section and a CYM section which are formed by partition in an optical box.

As shown in FIG. 4, an L-shaped bracket 60 is provided in the PLG section 36 so as to correspond to positions where the laser beams are emitted. The L-shaped bracket 60 contacts the second intermediate wall 44 via a sponge 68 and is mounted by fastening means such as a screw. The L-shaped bracket 60 includes an opening (not shown) formed along the longitudinal direction thereof and a glass plate 62 is mounted at the opening by adhesives so as to close the opening. The L-shaped bracket 60 may be inclined at an angle of several degrees so as to prevent regular reflection of the laser beams by the glass plate 62. An elongated hole 74 is formed in the second intermediate wall 44 in a transverse direction of the second intermediate wall 44 so as to allow the laser beams transmitted through the glass plate 62 to reach a cylinder mirror 72 (which will be described later).

The optical box 11 further includes a fourth chamber 55 partitioned by the second intermediate wall 44 and the third intermediate wall 49. The fourth chamber 55 is formed as a CYM section 76 serving as an exit section which emits the laser beams toward the photographic printing paper 104. A cylinder mirror 72 is disposed in the CYM section 76. A reflexing mirror 78 is disposed at the side of the cylinder mirror 72 from which the laser beams are emitted.

The cylinder mirror 72 is fixed to a base 82 by an L-shaped plate spring 80. One end of the plate spring 80 is mounted at the base 82 and the other end thereof is disposed to cover an upper side of the cylinder mirror 72. Therefore, the plate spring 80 also has a dustproof effect for the cylinder mirror 72.

As shown in FIG. 3, the mirror 34, the spherical lenses 38, the cylindrical lenses 40, the polygon mirror 46, the fθ lens 48, the cylindrical lens 50, the cylinder mirror 72, and the reflexing mirror 78 are all enclosed by the side wall 64 and are disposed at positions apart from a passage of air from a fan 102 (indicated by arrow D in FIG. 4), that is, positions which are not affected by air from the fan 102.

Figure 6:
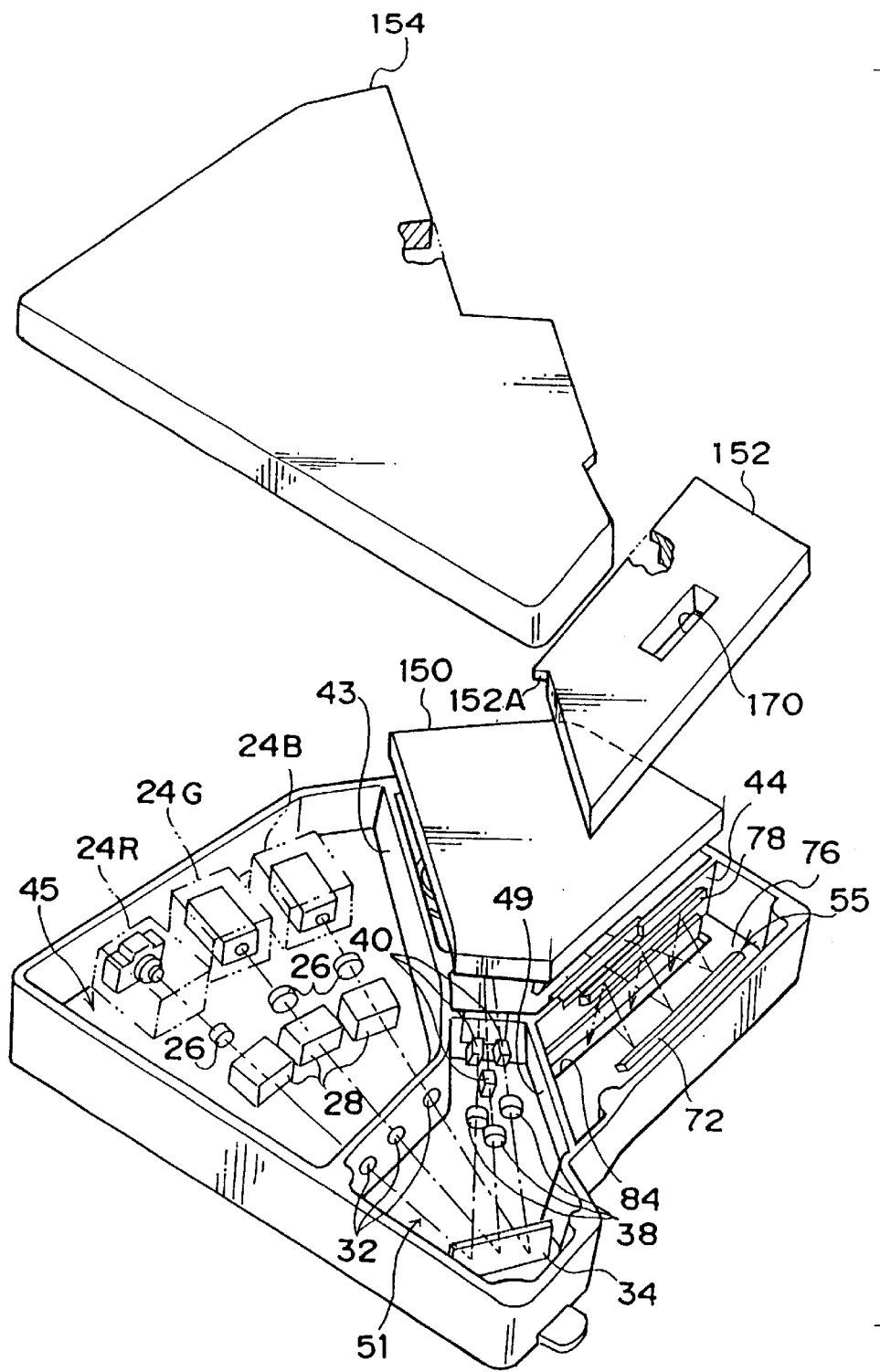
FIG. 6 is an assembly diagram of the dustproof structure of an optics boy according to the embodiment of the present invention.
Figure 7:
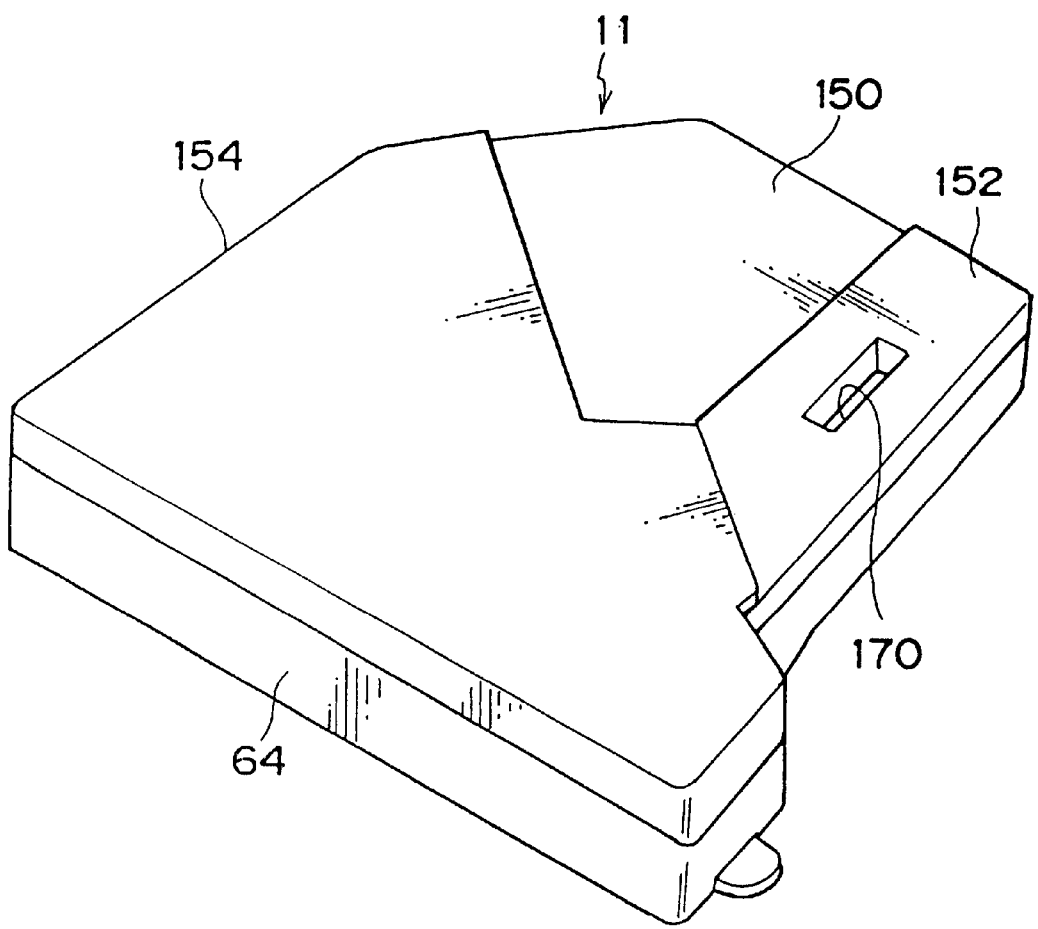
FIG. 7 is a plan view of the dustproof structure of an optical box according to the embodiment of the present invention.

The upper side of the side wall 64 is covered by three small lids. Concretely, as shown in FIGS. 6 and 7, the PLG section 36 is covered by a first small lid 150. The first small lid 150 is formed by a flat plate and is mounted to the side wall 64 via a sealing material such as a sponge 83 in a watertight manner. Further, as shown in FIG. 4, a rib 85 which abuts against the side wall 64 during assembling is formed in the first small lid 150, and by regulating the vertical dimension of the rib 85, the state (degree) of deformation of the sponge 83 is controlled. Therefore, there is no possibility of the sponge 83 being compressed firmly so as to become inflexible, and the dustproofing effect in the interior of the PLG section 36 is improved. A high-level dustproofing effect is required by the PLG section 36, and therefore, the first small lid 150 is disposed at the lowermost position of the three small lids.

The CYM section 76 is covered by a second small lid 152. An air hole 170 is formed at the center of the second small lid 152 so as to supply air from the fan 102 into the optical box 11. A dustproofing effect of the second highest level (medium level) is required by the CYM section 76, and therefore, a portion of the second small lid 152 is disposed so as to overlap with the first small lid 150 on the second intermediate wall 44. The thickness of the second small lid 152 is made large in a portion other than a region 152A in which the first small lid 150 and the second small lid 152 overlap with each other. As a result, formation of a clearance between the second small lid 152 and the side wall 64 is prevented.

Further, the light source section 29 and the reflecting section 27 are covered by the third small lid 154. Generally, a dustproofing effect of the third highest level (low level) is required by the light source section 29 and the reflecting section 27. The third small lid 154 is disposed so as to overlap with the first small lid 150 on the first and second intermediate walls 43 and 44 and further overlap with the second small lid 152 on the third intermediate wall 49. The third small lid 154 is formed in such a manner that the thickness of a region overlapping with the first small lid 150 is greater than that of a region overlapping with the second small lid 152. Further, the thickness of the third small lid 154 in a region which directly contacts with the side wall 64 is made larger than the thickness of a region which overlaps with the first small lid 150. As a result, formation of a clearance between the third small lid 154, the side wall 64, and the first small lid 150 is prevented. The third small lid 154 includes a hole (not shown) used to guide a harness to an exterior of the optical box 11.

As described above, the light source section 29, the PLG section 36, and the CYM section 76 are disposed by partitioning in the chambers 45, 53, and 55, respectively. The chambers 45, 53, and 55 are covered by the small lids 150, 152, and 154, which are provided in the above-described manner. Accordingly, the degree of sealing in the PLG section 36 which is tightly closed by the first small lid 150 located at the lowermost position can be set at the highest value. Secondly, the degree of sealing in the CYM section 76 which is tightly closed by the second small lid 152 located at the intermediate position can be set at the second highest value. Further, the degree of sealing in the light source section 29 and the reflecting section 27, which are tightly closed by the third small lid 154 located at the uppermost position, can be set at the third highest value. As a result, the differences in the degree of sealing between the chambers 45, 53, and 55 can be made so as to satisfy the above-described requirements.

Figure 5:
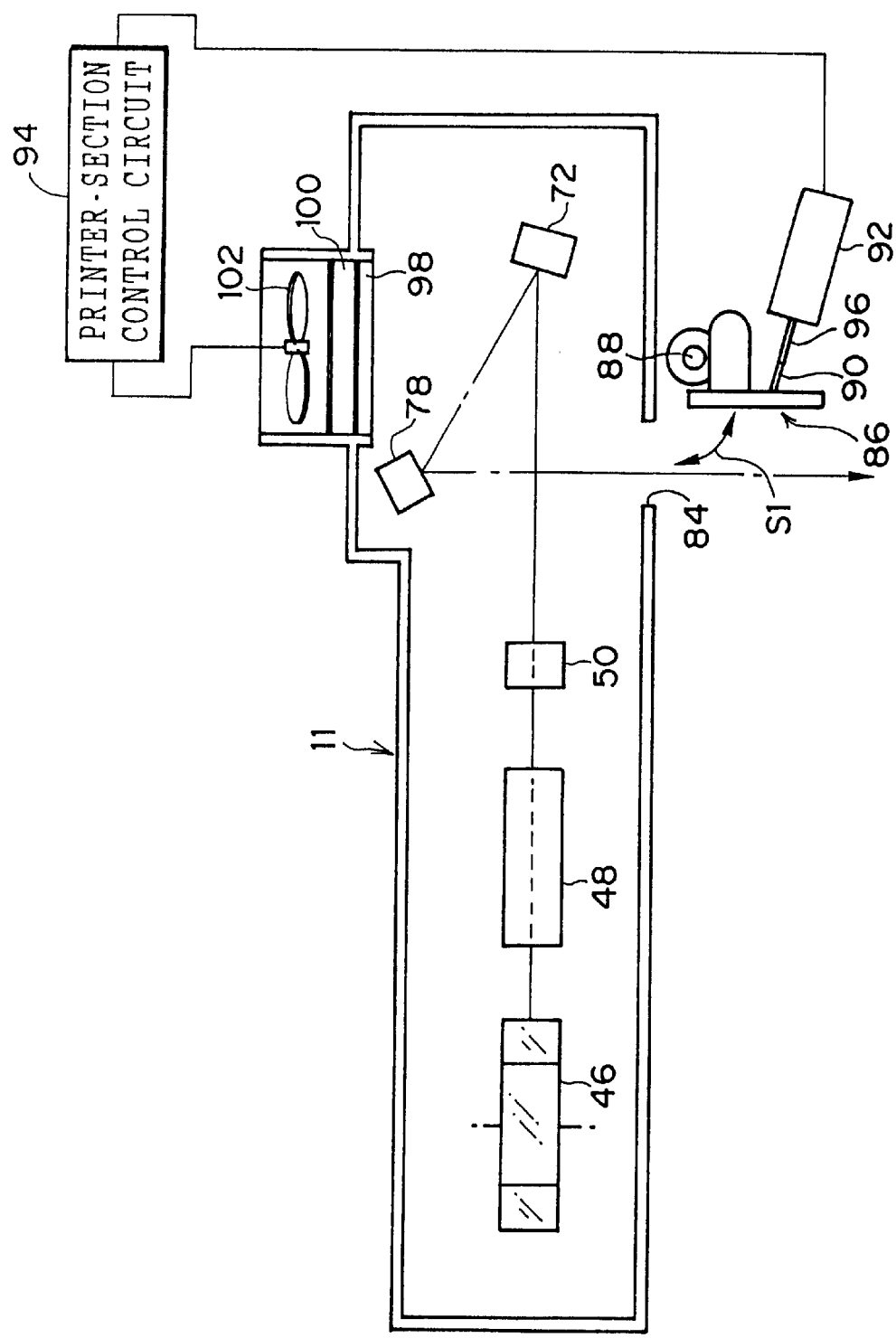
FIG. 5 is a schematic broken-out side view of the dustproof structure of an optical box according to the embodiment of the present invention.

As shown in FIGS. 4 and 5, an opening 84 is formed in the bottom of the CYM section 76 and the position and size of the opening 84 are set in such a manner that the laser beams emitted from the reflexing mirror 78 can be transmitted through the opening 84. In the opening 84, a shutter 86 which is swingable in directions indicated by the double-headed arrow S1 in FIG. 5 is mounted on a shaft 88. Further, dust absorbing tape (not shown) is applied to an inner side 86B of the shutter 86 so as to prevent the spread of waste matter or dust adhering to the shutter 86.

The shutter 86 is designed so that the shape and size thereof are substantially the same as those of the above-described opening 84. A shaft 96 of a solenoid 92 is connected to one end of the shutter 86 via a link 90.

When the solenoid 92 is not energized, the shutter 86 in the present invention is in the state indicated by the broken line in FIG. 4, that is, in a closed state. When the solenoid 92 is energized, the shutter 86 is in the state indicated by the solid line in FIG. 4, that is, in an open state. Accordingly, during a stoppage of the power supply, the shutter 86 is brought into a closed state and intrusion of dust from the opening 84 is prevented.

The above-described solenoid 92 is connected to a printer-section control circuit 94 (described later) serving as control means for controlling various portions of the laser printer section 16, and the operation of the solenoid 92 is controlled by the printer-section control circuit 94.

As shown in FIG. 4, an upper lid 66 is mounted to the upper portion of the second small lid 152 via a sealing material such as the sponge 83 in a watertight manner. Further, the rib 85 which abuts against the second small lid 152 during assembling is formed in the upper lid 66, and by regulating the vertical dimension of the rib 85, the state (degree) of deformation of the sponge 83 is controlled. Therefore, there is no possibility of the sponge 83 being compressed firmly, and the dustproofing effect in the interior of the CYM section 76 is improved.

Further, an opening 160 is formed in the upper lid 66. A supporting portion 162 is formed in the vicinity of the opening 160 so as to support an outer frame of a relatively coarse-grained first filter 98. The first filter 98 is provided to be positioned directly below the opening 160. Further, a relatively fine-grained second filter 100 (which can be replaced) is provided in the upper lid 66. Accordingly, when the second filter 100 is replaced, the first filter 98 prevents the intrusion of dust into the CYM section 76. The first filter 98 and the second filter 100 are each a fold type electrostatic filter and these filters are disposed in such a manner that the directions in which they are folded are made perpendicular to each other or are the same.

The collection efficiency of the first filter 98 is in the range of 2 to 60% for dust having a diameter of 0.3 $\mu$m, 5 to 70% for dust having a diameter of 0.5 $\mu$m, and 10 to 75% for dust having a diameter of 1.0 $\mu$m. Further, the collection efficiency of the second filter 100 is in the range of 50 to 99% for dust having diameters of 0.3, 0.5, and 1.0 $\mu$m. Alternatively, the collection efficiency of the first filter 98 is in the range of 50 to 99% for dust having diameters of 0.3, 0.5, and 1.0 $\mu$m, and the collection efficiency of the second filter 100 is in the range of 2 to 60% for dust having a diameter of 0.3 $\mu$m, 5 to 70% for dust having a diameter of 0.5 $\mu$m, and 10 to 75% for dust having a diameter of 1.0 $\mu$m.

As shown in FIG. 4, the fan 102 serving as pressurizing means for supplying air into the CYM section 76 via these filters 98 and 100 is disposed above the second filter 100. Further, a duct 101 is provided above the upper lid 66 so as to surround the fan 102 and thereby forms a vent hole.

The above-described fan 102 is connected to the printer-section control circuit 94 (described later) and the operation of the fan 102 is controlled by the printer-section control circuit 94.

Further, the above-described optical box 11 is preferably assembled in a clean room of a predetermined cleanliness class. The cleanliness class mentioned herein is a class in which an air cleanliness of a clean room is set in accordance with the state of grain density per grain diameter. The cleanliness class is indicated by an exponent in which the number of fine grains whose grain diameter is 0.1 $\mu$m, contained in 1 m$^3$ of air, is represented by the tenth power. Accordingly, as a value of the cleanliness class becomes smaller, the air cleanliness becomes high.

When installation of the polygon mirror 46 and the optical system in the optical box 11 and mounting of the small lids 150, 152, 154, and the upper lid 66 are carried out in the predetermined clean room, there is no possibility of dust adhering to the polygon mirror 46 and the optical system during assembling of the optical box 11, and no intrusion of dust into the optical box 11 occurs. As a result, dustproofing efficiency of a higher level can be maintained.

Concretely, it is necessary that the cleanliness class required by the PLG section 36 is 1000 or less, the cleanliness class required by the CYM section 76 is in the range from 10000 to 1000, and the cleanliness class required by the light source section 29 is 10000 or greater. Accordingly, it is preferable that the PLG section 36 is assembled in a clean room whose cleanliness class is 1000 or less, the CYM section 76 is assembled in a clean room whose cleanliness class is in the range from 10000 to 1000, and the light source section 29 is assembled in a clean room whose cleanliness class is 10000 or greater.

Figure 8:
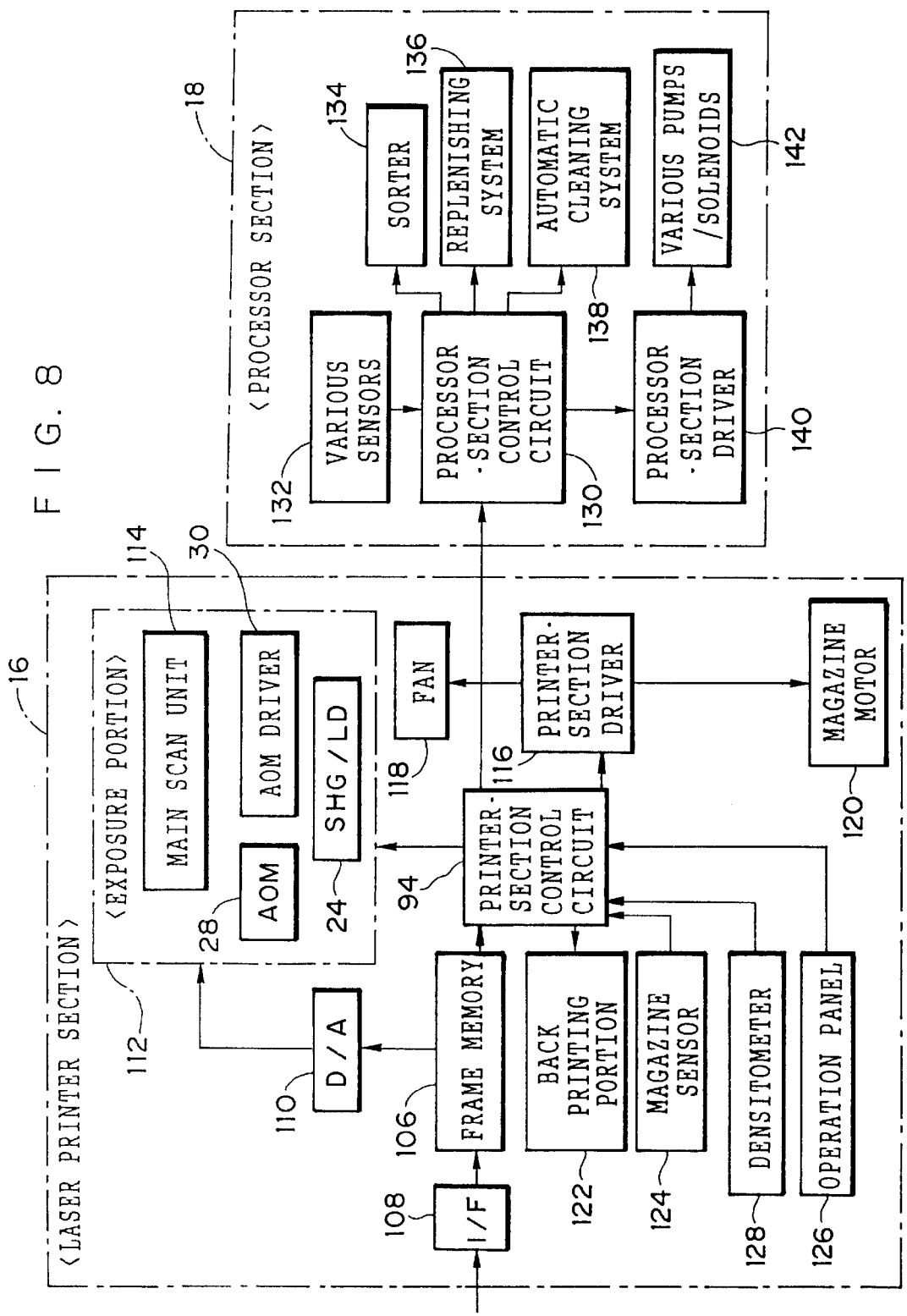
FIG. 8 is a block diagram which schematically shows an electrical structure of a laser printer section and a processor section, which sections form the digital laboratory system.

FIG. 8 schematically shows an electrical structure of the laser printer section 16 and the processor section 18. The laser printer section 16 includes a frame memory 106 in which image data is stored. The frame memory 106 is connected to the image processing section 14 via an I/F circuit 108 and recording image data inputted from the image processing section 14 (that is, data which represent densities of R, G, and B of each of images to be recorded on the photographic printing paper 104) are temporarily stored in the frame memory 106 via the I/F circuit 108. The frame memory 106 is connected to an exposure portion 112 via a D/A converter 110 and is also connected to the printer-section control circuit 94.

The exposure portion 112 includes three laser light sources 24 which are each comprised of LD (and SHG) as described above, and also includes three systems each having an AOM 28 and an AOM driver 30. Further, a main scan unit 114 equipped with the polygon mirror 46, the motor 47 for rotating the polygon mirror 46, the fan 102 which supplies air in the interior of the partition wall 64, the solenoid 92 for opening and closing the shutter 86, and the like is provided in the exposure portion 112. The exposure portion 112 is connected to the printer-section control circuit 94 and respective operations of the various portions in the exposure portion 112 are controlled by the printer-section control circuit 94.

A printer-section driver 11 6 is connected to the printer-section control circuit 94. Connected to the printer-section driver 116 are a fan 118 which supplies air in the exposure portion 112, and a magazine motor 120 by which the photographic printing paper 104 accommodated in a magazine (not shown) loaded in the laser printer section 16 is pulled out from the magazine. Further, connected to the printer-section control circuit 94 is a back printing portion 122 for printing characters and the like on a reverse side of the photographic printing paper 104. Respective operations of the fan 118, the magazine motor 120, and the back printing portion 122 are controlled by the printer-section control circuit 94.

Connected also to the printer-section control circuit 94 are a magazine sensor 124, an operation panel 126, a densitometer 128, and a processor-section control circuit 130. The magazine sensor 124 is provided to detect a state in which the magazine, in which an unexposed photographic printing paper 104 is accommodated, is mounted or removed and further to detect the size of the photographic printing paper 104 accommodated in the magazine, and the operation panel 126 is used by an operator to input various instructions. The densitometer 128 is used to measure the density of an image visualized by development processing or the like in the processor section 18, and the processor-section control circuit 130 is used to control the operation of the processor section 18.

Connected to the processor-section control circuit 130 are various sensors 132 for detecting the passing of the photographic printing paper 104 conveyed along a conveying path within the processor section 18 and detecting the liquid-level position of each of various processing solutions contained in the processing tank.

Connected also to the processor-section control circuit 130 are a sorter 134, a replenishing system 136, and an automatic cleaning system 138. The sorter 134 is provided to sort photographic printing paper, which has been discharged outside the apparatus after completion of development processing or the like, into predetermined groups. The replenishing system 136 is provided to replenish the processing tank with a replenishing solution, and the automatic cleaning system 138 is used to clean rollers and the like. Moreover, various pumps/solenoids 142 are also connected to the processor-section control circuit 130 via a processor-section driver 140. Respective operations of the sorter 134, the replenishing system 136, the automatic cleaning system 138, and the various pumps/solenoids 142 are each controlled by the processor-section control circuit 130.

Next, the operation of the printer-section control circuit 94 when an image is recorded on the photographic printing paper 104 will be described with reference to the flow chart shown in FIG. 9. Note that FIG. 9 is a schematic flow chart of a control program executed by a CPU (not shown) provided in the printer-section control circuit 94 when an image is recorded on the photographic printing paper 104 and the control program is stored in advance in a memory (not shown) provided in the printer-section control circuit 94.

Figure 9:
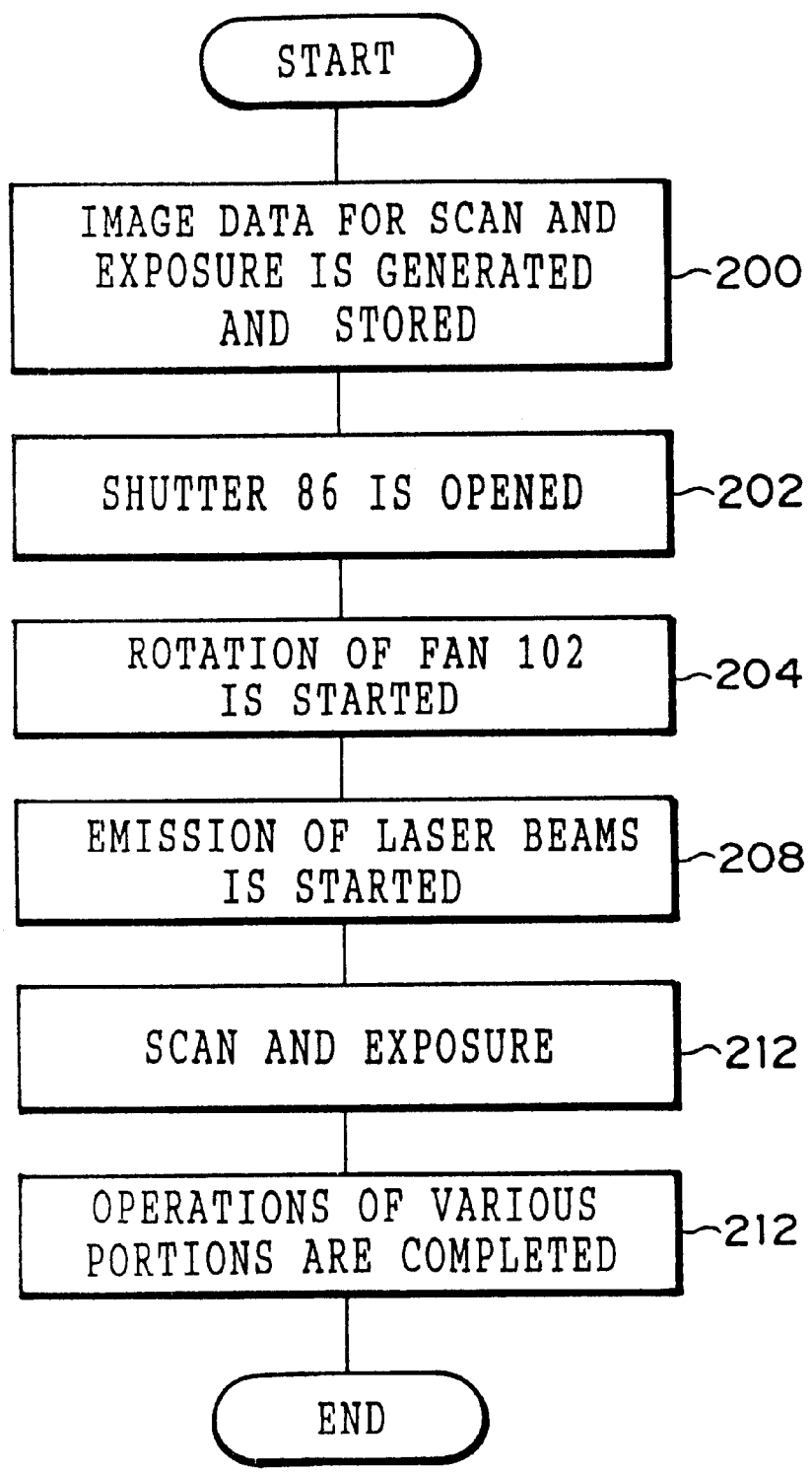
FIG. 9 is a schematic flow chart of a control program executed in a printer-section control circuit during scan and exposure.
Figure 10:
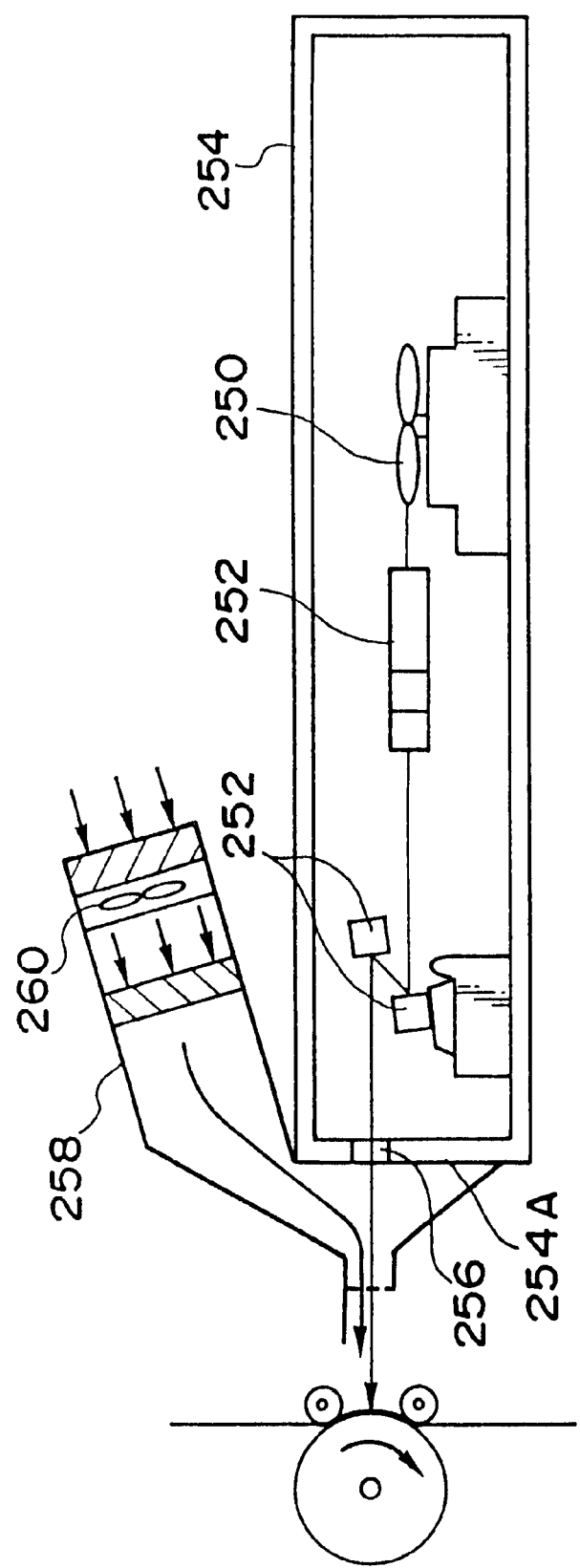
FIG. 10 is a schematic structural diagram of a conventional image forming apparatus.

In step 200 shown in FIG. 9, based on image-recording parameters inputted from the image processing section 14, various corrections are effected on the recording image data and image data for scan and exposure is generated and stored in the frame memory 106.

In step 202, the shutter 86 is brought into an open state by energizing the solenoid 92. In the subsequent step 204, rotation of the fan 102 is started 0.5 to 3 seconds after the shutter 86 was opened and air at a rate of 0.2 to 3.0 m/s is thereby supplied into the CYM section 76. Accordingly, the CYM section 76 is pressurized after the shutter 86 is set in an open state, and therefore, there is no possibility of dust adhering to the inner side of the shutter 86 spreading within the CYM section 76.

In step 208, laser beams are emitted from the laser light sources 24R, 24G, and 24B. In step 210, scan and exposure is carried out in the following procedure.

Namely, the image data for scan and exposure generated in the above-described step 200 is outputted from the frame memory 106 to the AOM driver 30 via the D/A converter 110. As a result, the image data for scan and exposure is converted to an analog signal and inputted to the AOM driver 30.

The AOM driver 30 changes the amplitude of an ultrasonic wave signal to be supplied for the AOM 28 in correspondence with the level of each of inputted analog signals, and modulates the intensity of the laser beam emitted from the AOM 28 as diffracted light in correspondence with the level of the analog signal (that is, any one of densities of R, G, and B of each pixel of an image to be recorded on the photographic printing paper 104). Accordingly, three AOMs 28 respectively emit laser beams of R, G, and B whose intensity is modulated correspondingly to the densities of R, G, and B of an image to be recorded on the photographic printing paper 104, and these emitted laser beams are irradiated on the photographic printing paper 104 via the mirror 34, the spherical lenses 38, the cylindrical lenses 40, the polygon mirror 46, the fθ lens 48, the cylindrical lens 50, the cylinder mirror 72, and the reflexing mirror 78.

A latent image is recorded on the photographic printing paper 104 by scan and exposure in which main scan is effected with respective positions where the laser beams are irradiated being scanned along the direction indicated by arrow B in FIG. 3 together with the rotation of the polygon mirror 46 in the direction indicated by arrow A in FIG. 3, and sub-scan of the laser beams is effected with the photographic printing paper 104 being conveyed along the direction indicated by arrow C in FIG. 3 at a constant speed.

When the scan and exposure is completed as described above, in step 212, the rotation of the polygon mirror 46 and the emission of the laser beams are stopped, and the rotation of the fan 102 is also stopped. Then, after 0.5 to 3 seconds, energization of the solenoid 92 is stopped and the shutter 86 is placed in a closed state. Thereafter, the control program ends.

The photographic printing paper 104 on which a latent image is recorded by the above-described scan and exposure is conveyed into the processor section 18 and subjected therein to various processings including color development, bleach-fixing, washing, and drying. As a result, an image is formed on the photographic printing paper 104.

As described above in detail, the dustproof structure of an optical box in the laser printer section 16 according to the embodiment of the present invention is constructed in such a manner that, during scan and exposure with laser beams, after the shutter 86 is brought into an open state, the interior of the CYM section 76 formed by partition in the optical box 11 is pressurized by the fan 102, and at the time of completion of the scan and exposure, the shutter 86 is brought into a closed state after the pressurization, thereby making it possible to prevent the spread of dust adhering to a reverse side of the shutter 86 within the CYM section 76. As a result, the intrusion of dust into elements such as lenses and mirrors, which form an optical system provided in the CYM section 76, can be prevented.

Moreover, the dustproof structure of an optical box in the laser printer section 16 according to the present embodiment is constructed in such a manner that the polygon mirror 46 is surrounded by the first intermediate wall 43 and the second intermediate wall 44 and is further completely closed by the first small lid 150 in an airtight manner. Accordingly, even when the polygon mirror 46 is rotated in a normal atmosphere at such a rotational speed as to cause blur on the mirror surface (for example, 1,000 rotations/minute or higher), occurrence of blur on the mirror surface can be avoided to thereby prevent contamination of the mirror surface.

The present embodiment was described above in a case in which the intensity of the laser beam is modulated by the AOMs 28, but the present invention is not limited to the same. For example, the intensity of the laser beam may be modulated by using an electro-optic modulation element (EOM) or a magneto-optic modulation element (MOM) in place of the AOMs 28.

In the present embodiment, the optical box 11 is divided into four chambers 45, 51, 53, and 55, but the first chamber 45 and the second chamber 51 may be formed as one chamber by removing a partition portion 43A (see FIG. 3) of the first intermediate wall 43 by which the first chamber 45 and the second chamber 51 are partitioned.

According to the dustproof structure of an optical box provided by the present invention, the intrusion of dust into the optical box from an opening and also from an outside of the optical box can be prevented.

Further, the spread of dust adhering to the inner side of opening and closing means within the exit section can be prevented. Accordingly, it is possible to prevent dust from adhering to a lens, a mirror, and the like, which are provided in the exit section.

Moreover, the light source section, polygon section, and exit section are disposed by partitioning in different chambers, and the small lids are disposed so as to partially overlap with one another. Accordingly, the differences in the degree of sealing between these chambers can be made so as to satisfy the respective degrees of sealing required by the light source section, polygon section, and exit section.

What is claimed is:

1. A dustproof structure of an optical box, which is used in an optical box which includes a light source section which emits laser beams, a polygon section comprised of deflecting means for deflecting laser beams and an optical system by which laser beams deflected by the deflecting means are converged on a photosensitive material, and an exit section which emits the laser beams emitted from the polygon section outside the optical box, comprising:

an opening formed in the optical box for guiding the laser beams to the photosensitive material; and pressurizing means for pressurizing an interior of the optical box by supplying air to the interior of the optical box, thereby preventing intrusion of dust from said opening and from outside of the optical box, wherein the light source section, the polygon section, and the exit section are provided in such a manner that differences in the degree of sealing are made among chambers in which the three sections are disposed by partitioning.

2. A dustproof structure of an optical box according to claim 1, further comprising:

opening and closing means for opening and closing said opening; and control means in which, when scan and exposure is being carried out by the laser beams, said opening is opened by said opening and closing means, and thereafter, the interior of the optical box is pressurized by said pressurizing means, and when the scan and exposure ends, said pressurizing means is stopped, and thereafter, said opening is closed by said opening and closing means.

3. A dustproof structure of an optical box according to claim 1, further comprising opening and closing means for opening and closing said opening, which includes a shaft, a shutter mounted around the shaft in a swingable manner, and a solenoid having a shaft connected to one end of the shutter.

4. A dustproof structure of an optical box according to claim 3, wherein the shutter is formed so that the shape and size thereof are substantially identical to those of said opening.

5. A dustproof structure of an optical box, which is used in an optical box which includes a polygon section comprised of deflecting means for deflecting laser beams and an optical system by which laser beams deflected by the deflecting means are converged on a photosensitive material, comprising:

an opening formed in the optical box for guiding the laser beams to the photosensitive material;

pressurizing means for pressurizing an interior of the optical box by supplying air to the interior of the optical box, thereby preventing intrusion of dust from said opening and from outside of the optical box;

opening and closing means for opening and closing said opening, which includes a shaft, a shutter mounted around the shaft in a swingable manner, and dust absorbing tape bonded to a surface of the shutter facing the interior of the optical box; and control means in which, when scan and exposure is being carried out by the laser beams, said opening is opened by said opening and closing means, and thereafter, the interior of the optical box is pressurized by said pressurizing means, and when the scan and exposure ends, said pressurizing means is stopped, and thereafter, said opening is closed by said opening and closing means.

6. A dustproof structure of an optical box, said optical box including in an interior thereof a polygon section comprised of deflecting means for deflecting laser beams and an optical system by which laser beams deflected by the deflecting means are converged on a photosensitive material, comprising:

an opening formed in the optical box for guiding the laser beams to the photosensitive material;

pressurizing means for pressurizing the interior of the optical box by supplying air to the interior of the optical box, thereby preventing intrusion of dust from said opening and from outside of the optical box;

a partition wall;

a partition plate; and an upper lid, wherein said partition wall, said partition plate, and said upper lid are provided to completely close airtightly the polygon section.

7. A dustproof structure of an optical box according to claim 6, wherein said partition plate is mounted at an upper portion of said partition wall via a first sealing material in a watertight manner.

8. A dustproof structure of an optical box according to claim 7, wherein the first sealing material is sponge.

9. A dustproof structure of an optical box according to claim 7, wherein a rib is formed in said partition plate.

10. A dustproof structure of an optical box according to claim 7, wherein said upper lid is mounted at an upper portion of said partition plate via a second sealing material in a watertight manner.

11. A dustproof structure of an optical box according to claim 10, wherein the second sealing material is sponge.

12. A dustproof structure of an optical box according to claim 11, wherein a rib is formed in said upper lid.

* * * * *